March 10, 1925.
D. L. MIDDENDORF
1,529,365
APPARATUS FOR FORMING GLASS ARTICLES
Filed Oct. 3, 1922    2 Sheets-Sheet 1
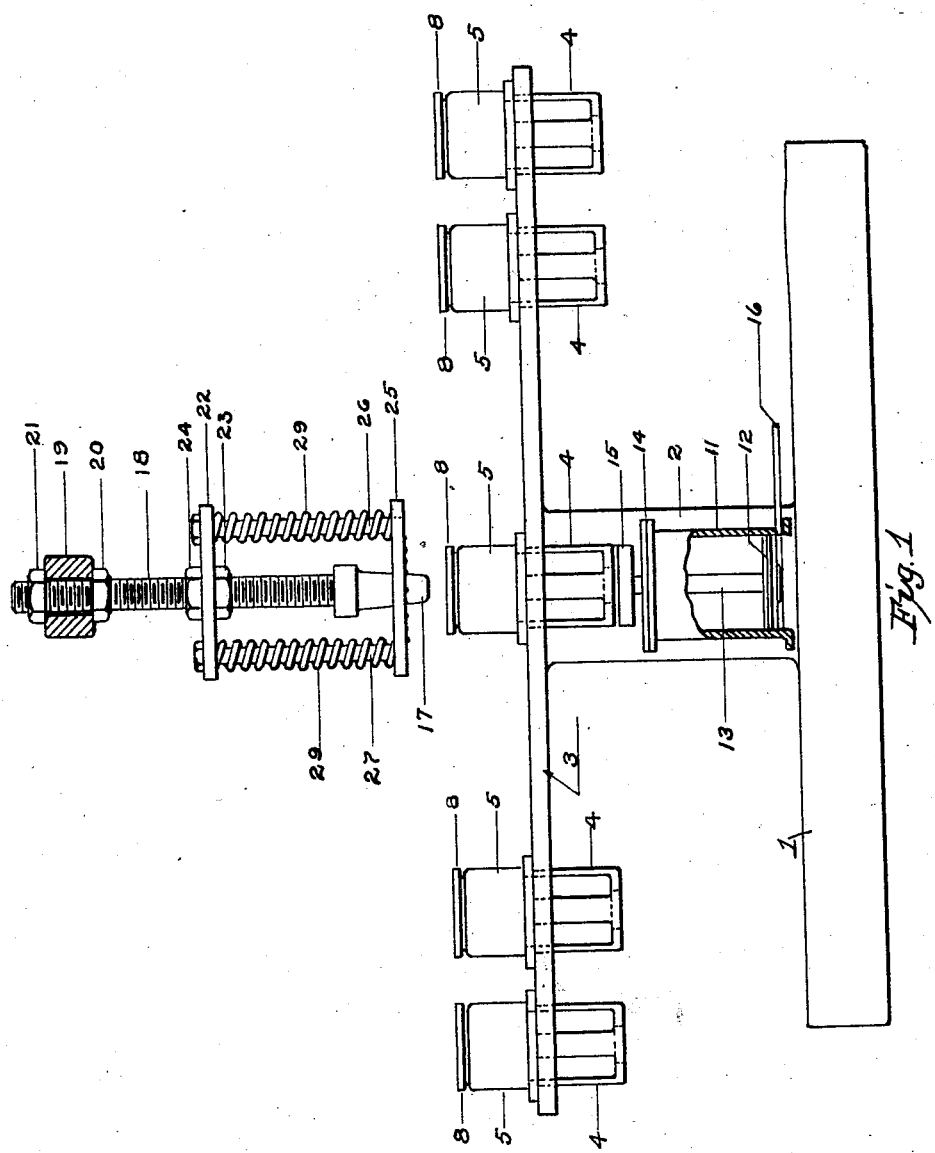
David L. Middendorf — INVENTOR.
BY
Edwin P. Corker — ATTORNEY.

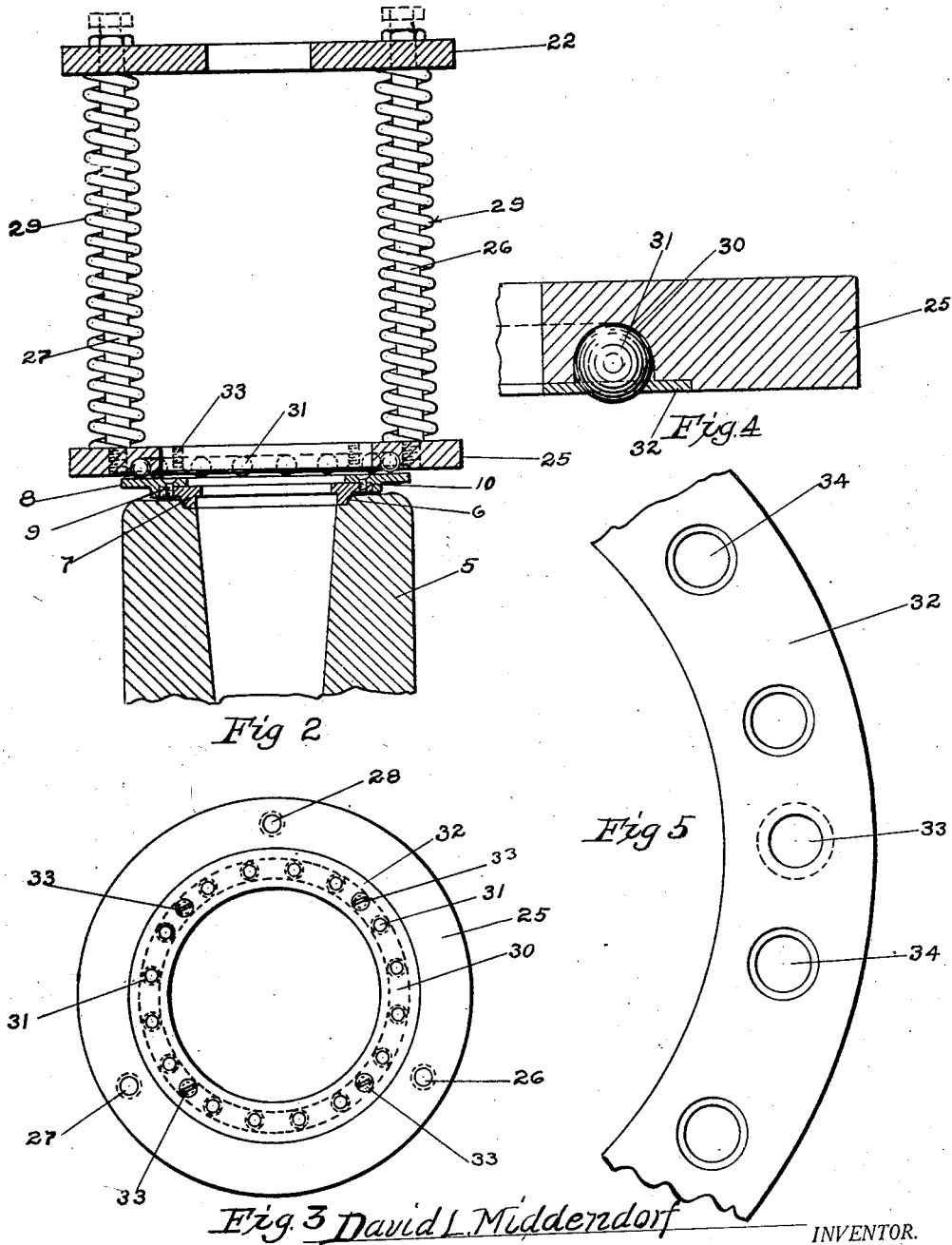

Patented Mar. 10, 1925.

1,529,365

UNITED STATES PATENT OFFICE.

DAVID L. MIDDENDORF, OF COLUMBUS, OHIO, ASSIGNOR TO THE FEDERAL GLASS COMPANY, OF COLUMBUS, OHIO, A CORPORATION OF OHIO.

APPARATUS FOR FORMING GLASS ARTICLES.

Application filed October 3, 1922. Serial No. 592,121.

*To all whom it may concern:*

Be it known that DAVID L. MIDDENDORF, a citizen of the United States of America, residing at Columbus, in the county of Franklin and State of Ohio, has invented certain new and useful Improvements in Apparatus for Forming Glass Articles, of which the following is a specification.

My invention relates to an apparatus for forming glass articles and, more particularly, to an improved apparatus for forming deep ring ware wherein a mold carrying a mold ring, a forming plunger and a spring plate are employed.

In the manufacture of food-containing glass articles, such as deep ring ware having a cap-fit portion, by the customary type of apparatus, much difficulty has been experienced in preventing the straining of the articles at the cap-fit portion. Such straining results in undue breakage at that point. This straining is apparently caused by the transmission of a torsional action of the forming apparatus to the glass article.

An object of my invention is to prevent straining of the glass articles.

In accomplishing this object of my invention I provide means for preventing the transmission of torsional or other movement of the forming apparatus to the glass article.

Other and further objects of my invention will be apparent as this description progresses and will be brought out in the claims appended hereto. The various objects are preferably attained by the structure illustrated in the drawings wherein similar characters of reference designate corresponding parts in the several figures, and wherein—

Figure 1 is an elevation of a glass forming apparatus employing my invention.

Figure 2 is an enlarged detail sectional view showing the relative positions of the mold, the combined ring yoke and mold ring and the bottom plate of the spring plate construction when contacting. The dotted lines above the top plate of the spring plate construction show a position of the spring plate stud bolts during the forming of the glass article.

Figure 3 is a plan view of the bottom plate of the spring plate construction employing my invention.

Figure 4 is an enlarged fragmentary view of a portion of the bottom plate of the spring plate construction showing the relative positions of the balls and ball-retaining plate.

Figure 5 is an enlarged fragmentary plan view of the ball-retaining plate showing the countersinking of the ball holes from the inside.

Referring particularly to the drawings, to illustrate my invention I employ an apparatus adapted to produce deep ring ware such as food containers wherein 1 represents a base plate which may be of any suitable shape and material. Rigidly mounted at the central portion of the base 1 is a vertical standard 2. The standard 2 is adapted to carry at its top a rotatably mounted mold table 3 which may be mounted in any suitable manner and by any suitable means so as to intermittently bring each of a series of molds mounted thereon successively into vertical alignment with the forming mechanism.

The mold table 3 is provided with a series of equally spaced holes in which are carried the mold baskets 4, five being shown. Each mold basket 4 is adapted to carry a mold 5 and is so constructed and placed on the mold table 3 as to permit of a vertical movement, and in turn, a vertical movement of the mold 5.

The molds 5 are carried and arranged in their respective mold baskets 4 by any suitable and desired means. Each mold 5 is provided at its top with a seat portion 6 upon which a seating portion of the mold ring 7 is adapted to seat and form the top or cap-fit portion of the glass article. The mold ring 7 is rigidly secured to the ring yoke 8 by the screws 9 and 10 so that the two parts combined compose a single movable unit.

The mold baskets 4 and, in turn, the molds 5 are movable vertically to contact with the forming mechanism by an air cylinder construction comprising a body 11 containing a piston 12. The piston 12 has a stem 13 which extends through the cylinder head 14 and carries an abutting portion 15 which contacts with the lower part of the mold basket 4 to move it upward. The movement of the cylinder 12 is controlled by fluid pressure through the pipe 16. The admission of pressure to and exhaust from the face of the piston 12 is controlled by any desired means to suit the preferences of the user.

A stationary pressing mechanism is employed and comprises a forming plunger 17 having a threaded stem 18. The plunger stem 18 is carried in a fixed member 19. The plunger 17 is also vertically adjustable by screwing the lock nuts 20 and 21 up or down on the threaded portion of the said plunger 17.

To provide means for cushioning the upward movement of the mold 5, I employ a spring plate mechanism which comprises a stationary circular top plate 22 through the center of which the threaded stem 18 of the plunger 17 passes. The top plate 22 is rigidly held in a certain position on the plunger stem 18 by lock nuts 23 and 24 and is vertically adjustable with respect to the plunger 17 by screwing the said lock nuts up or down on the threaded plunger stem 18. A circular bottom plate 25 is provided, through and below which the plunger 17 passes. The top plate 22 and the bottom plate 25 are held together in vertical alignment by three equally spaced stud bolts 26, 27, and 28 which are rigidly secured in place in the bottom plate 25 and slidably movable through the top plate 22 so that when the bottom plate 25 is moved upward the said stud bolts 26, 27 and 28 will likewise be moved upward through the top plate 22. When the said plates are the maximum distance apart, the heads of the stud bolts 26, 27 and 28 bear upon the top of the top plate 22 serving to prevent the disjoining of the said two plate 22 and 25 as well as determining the maximum distance that they can be moved apart.

Interposed between the top plate 22 and the bottom plate 25 are coil springs 29 which are of such length as to contact with each of the plates when they are at their maximum distance apart whereby as the distance between the plates is reduced the said coil springs 29 are compressed, the amount of compression depending upon the distance the bottom plate 25 is moved upward. The coil springs 29, three in number, are placed around the stud bolts 26, 27 and 28 and are, therefore, held at all times in a certain predetermined position between the plates 22 and 25. The springs 29 are of such construction and are so placed that they resiliently oppose the upward movement of the bottom plate 25 and, in turn, the upward movement of each mold 5 when it is moved to form the glass article.

When employing the above structure, as the mold 5 is moved upward to contact with the plunger 17, the ring yoke surface of the combined ring yoke 8 and mold ring 7 is presented to the lower face of the bottom plate 25 while the mold ring 7 is seated upon the mold seat 6. The adjacent surfaces of the ring yoke 8 and the bottom plate 25 are greater in area than the bearing surfaces between the mold ring 7 and the mold 5 and, when the said adjacent surfaces fully contact, one with the other, there is apparently a greater friction between those surfaces than between the mold ring 7 and the mold 5 whereupon torsional movement of the bottom plate 25 is transmitted to the mold ring 7 and consequently to that portion of the glass article held by the mold ring, causing straining of that portion. This torsional movement may be transmitted to the bottom plate 25 by the twisting action of the springs 29 when they are put under compression. Obviously, due to the resilient nature of the stud bolts 26, 27 and 28 and their sliding fit in the top plate 22, the bottom plate 25 will actually take a twisting movement when such movement is transmitted to it by the springs 29. Even a slight torsional movement so transmitted to the bottom plate 25 results in the straining of the glass article as above set forth.

But such a condition is prevented by my invention which has to do with the reducing of the friction between the ring yoke 8 and the bottom plate 25. To accomplish this I provide in the bottom plate 25 an anti-friction bearing means for contacting with the ring yoke 8.

To provide the above anti-friction bearing means, I employ in the contacting face of the bottom plate 25 a circular ball groove 30. A plurality of balls 31 are adapted to be carried in the said ball groove 30. The balls are held in place by a suitably provided circular plate 32 which is secured in place flush with the lower surface of the bottom plate 25 by screws 33. The plate 32 is provided with a plurality of holes 34, one hole for each ball 31 employed. To permit of the balls 31 extending through the plate 32 so as to contact with the ring yoke 8 during the forming period, the holes 34 in the ball plate 32 are countersunk from the inside permitting a sufficient portion of the balls 31 to extend through. By this construction, the entire bearing between the bottom plate 25 and the ring yoke 8 is accomplished through a plurality of ball points which effect a ball bearing, whereupon the friction between the bottom plate 25 and the ring yoke 8 is reduced. By reducing the friction between the bottom plate 25 and the ring yoke 8 as described above, torsional movement of the bottom plate 25 will not be transmitted through the combined ring yoke and mold ring to the glass article thereby preventing the aforementioned straining of the glass article.

From the foregoing description it is obvious that my invention overcomes the objections and difficulties heretofore prevalent in the art, in that, when the mold 5 is moved upward to form the article and the article is formed and the mold lowered, any rotary, twisting or other movement of the bottom plate 25 will not be transmitted to the article formed but will take place between the bottom plate 25 and the ring yoke 8.

I have shown and described my invention as employed in connection with an apparatus wherein the mold is moved upward to form the articles but it is evident to those skilled in the art that the objections hereinbefore mentioned are equally applicable to an apparatus wherein a stationary mold and a reciprocating plunger are employed and that my invention will overcome the said objections in either case.

Having thus described my invention, what I claim is

1. In apparatus for producing glassware, a mold, a mold ring, and bearing means for preventing movement of the mold ring.

2. In apparatus for producing glassware, a mold, a mold ring, and anti-friction means for preventing movement of the mold ring.

3. In apparatus for producing glassware, a mold, a mold ring, and anti-friction means for preventing torsional movement of the mold ring.

4. In apparatus for producing glassware, a mold, a mold ring, means contacting with the mold ring during forming, and an anti-friction bearing between said contacting means and the said mold ring.

5. In apparatus for producing glassware, a mold, a mold ring, means contacting with the mold ring during forming, and means between the said mold ring and said contacting means effective to prevent movement of the said mold ring.

6. In apparatus for producing glassware, a mold, a mold ring, and bearing means for preventing movement of the mold ring upon the mold.

7. In apparatus for producing glassware, a mold, a mold ring, and bearing means for preventing torsional movement of the mold ring upon the mold.

8. In an apparatus for forming glassware, a mold, a mold ring, and anti-friction means carried by the pressing mechanism contacting with the mold ring.

9. In an apparatus for forming glassware, a mold, a mold ring, a spring plate, and means preventing the transmission of torsional movement of the said spring plate to the mold ring.

10. In an apparatus of the type described, a spring plate having an anti-friction bearing face which contacts with the glass containing unit during shaping.

11. In apparatus for producing glassware, a mold, pressing mechanism, and anti-friction means for preventing torsional stress upon the ware during pressing.

12. In apparatus for producing glassware, a mold, pressing mechanism, and anti-friction means for preventing movement of any of the metal parts with relation to the ware.

13. An apparatus for producing glassware, a mold, a mold ring, mechanism for shaping the glass in the mold, and anti-friction means carried by said shaping mechanism for preventing transmission of torsional movement of said shaping mechanism to said mold ring.

14. An apparatus for producing glassware, a mold, a mold ring, mechanism for shaping the glass in the mold, and anti-friction means carried by said shaping mechanism and contacting with said mold ring during shaping for preventing transmission of torsional movement of the said shaping mechanism to the said mold ring.

In testimony whereof I hereby affix my signature.

DAVID L. MIDDENDORF.